June 18, 1963 C. J. SCHULTZ 3,094,293
TAPE FEEDING AND STORAGE DEVICE
Filed Jan. 8, 1960 2 Sheets-Sheet 1

INVENTOR.
Curtis J. Schultz,
BY Mueller & Aichele
Att'ys.

TAPE FEEDING AND STORAGE DEVICE

Filed Jan. 8, 1960

INVENTOR.
Curtis J. Schultz,
BY Mueller & Aichele
Att'ys.

3,094,293

TAPE FEEDING AND STORAGE DEVICE

Curtis J. Schultz, Elmhurst, Ill., assignor to Motorola, Inc., Chicago, Ill., a corporation of Illinois Filed Jan. 8, 1960, Ser. No. 1,197
6 Claims. (Cl. 242—55.01)

This invention relates generally to tape storage devices and more particularly to a device which houses and feeds a continuous loop tape into an automatic programmer.

Tapes containing coded information in various forms are used to actuate automatic programmer devices for various purposes such as remote control of traffic control systems for highways, railroads, and other transportation channels. The tapes may be of various types and configurations such as tapes with punched holes providing the information, magnetic tapes, or tapes containing information of any kind. Tape storage and feeding have presented problems since repetitive program cycles sometimes have durations of several days, weeks, or months and the physical dimensional limitations of long lengths of tape have hampered efficient operation of automatic program equipment and caused the available program lengths to be shortened. Also, in such automatic devices a serious problem is presented when the tape breaks and it is desirable that an alarm be provided and for the tape-feed mechanism to cease operation, thereby preventing the loose or unwound tape from falling into the feeder mechanism.

It is therefore an object of the present invention to provide a simple and compact device for storing long lengths of program tape.

Another object of the invention is to provide a device that provides reliable feeding and storing of a continuous loop of program tape.

A further object of the invention is to provide a tape storage device which will readily accommodate relatively long lengths of tape and will feed the tape therefrom smoothly and without damaging the tape.

Still another object of the invention is to provide a tape storage device which will cause the feed mechanism to cease operation if the tape breaks or tears.

A feature of the invention is the provision of a continuous-loop tape feed mechanism utilizing two storage spools around which the tape is wound, with the tape being fed on the outside turn and taken off from the inside turn.

Another feature of the invention is the provision of a tape storage and feed mechanism with two spaced spools around which the tape is wound, and which permits slack in the inside loops so that all loops are of the same length and the tape does not slide on itself as the loops proceed from the outside to the inside during tape movement.

Still another feature of the invention is the provision of a tape feeding device having a receptacle for housing unwound tape prior to being fed to a programmer thereby allowing slack in the tape and lessening the likelihood of breaking or tearing the tape.

The invention is illustrated in the attached drawings in which.

In practicing the invention there is provided a tape feeding and storage device wherein a continuous loop of tape is stored and fed into an automatic programmer apparatus. The tape is stored on two spools positioned in the same plane but spaced apart from each other so that tape may be wound around these spools for storage. Tape is fed onto the two spools to form the outer loop and is removed from the inside loop. The inner loops are allowed to develop slack so that every loop from the outside loop to the inside loop is the same length and there is no sliding of the tape on adjacent loops. Tape from the inside loop at the lower spool is fed through a driving means whereby the tape is pulled and given a full twist so that it is in proper position. The tape is then fed to an unwound tape receptacle in the lower portion of the tape storage housing. A quantity of unwound tape is housed in this receptacle and is stacked loosely therein. The spools are rotated as tape is removed therefrom and this spool rotation causes tape to be wound on the outside loop. After passing in increments through the automatic programmer the tape passes through switching mechanism whereby the driving means operates periodically during normal tape feeding operation and if the tape breaks or tears the driving means is de-energized and an alarm signal is indicated. A guide roller and tension clip provide a path for the tape back to the spools. The tape is therefore withdrawn from the receptacle and passed through a tension clip and guide roller into the automatic programmer apparatus.

Figures 1, 2:
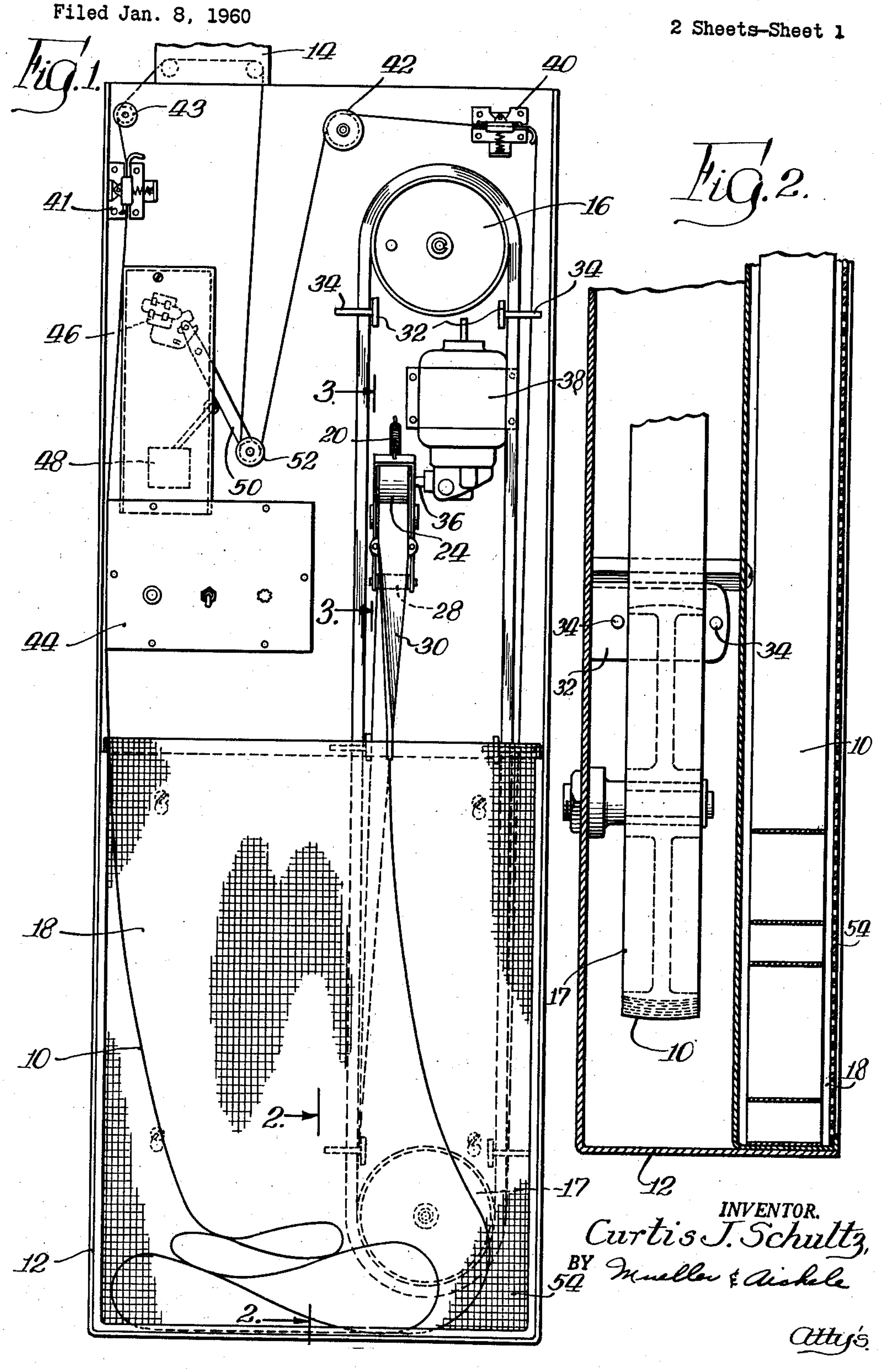
FIG. 1 is a plan view of the device exemplifying the invention.
FIG. 2 is a sectional view along line 2—2 of FIG. 1.

Referring now to the drawings, in FIG. 1 there is illustrated a plan view of the device exemplifying the invention. The continuous tape 10 is fed through an automatic programmer apparatus 14 and then passed around a roller 52 attached to a movable switch arm 50.

Switch arm 50 is almost vertical when it is at the bottom end of its movement. At this point mercury switch 46 is actuated and switch 48 is not actuated. Switch 46 when closed energizes motor 38 until sufficient tape has been wound on storage reels 16 and 17 to raise switch arm 50 to a horizontal position where switch 46 opens and motor 38 is de-energized. The tape is advanced in small increments by automatic programmer apparatus 14 and switch arm 50 is lowered gradually by gravity thus maintaining tension on the tape. When switch arm 50 nears the bottom end of its travel, switch 46 is closed and the cycle just described is repeated.

Switch arm 50 does not actuate switch 48 under normal operating conditions since switch 46 is actuated first to energize motor 38 and raise switch arm 50. If the tape breaks, switch arm 50 drops thus closing switch 46 and energizing motor 38. Since there is an absence of a solid tape loop, switch arm 50 drops down far enough to actuate switch 48, de-energize motor 38, and initiate an alarm signal. Without switch 48, motor 38 would operate continuously if the tape broke and all of the tape stored on spools 16 and 17 would be unwound. The main off-on switch is connected to wiring junction box 44.

After passing over the switch arm roller 52, the tape passes over guide roller 42 and through tension clip 40. The tape is positioned by guide plate 32 and guide plate pins 34 as it is wound around lower spool 17, over upper spool 16, and back down to lower spool 17 whereby tape is stored in stacked loops on the two spools. From lower spool 17 the inside winding of tape passes through a driving mechanism shown in more detail in FIG. 3. The tape which has been unwound from the inside loop is then temporarily stored in an unwound tape receptacle 18 and fed through a tension clip 41 and around guide roller 43 into the automatic programmer apparatus 14. Thus, the tape is a continuous loop following a predetermined path.

FIG. 2 shows lower spool 17 and the unwound tape receptacle 18. Tape 10 is stacked on the lower spool 17 and a guide plate 32 having two guide pins 34 positions the tape onto the spool. Unwound tape receptacle 18 is enclosed on five sides and has a screen 54 in the front portion so that a visual inspection of unwound tape can be made as to condition of the tape. Also, a viewer can see that the tape is properly stacked before being fed into the automatic programmer apparatus.

Figure 3:
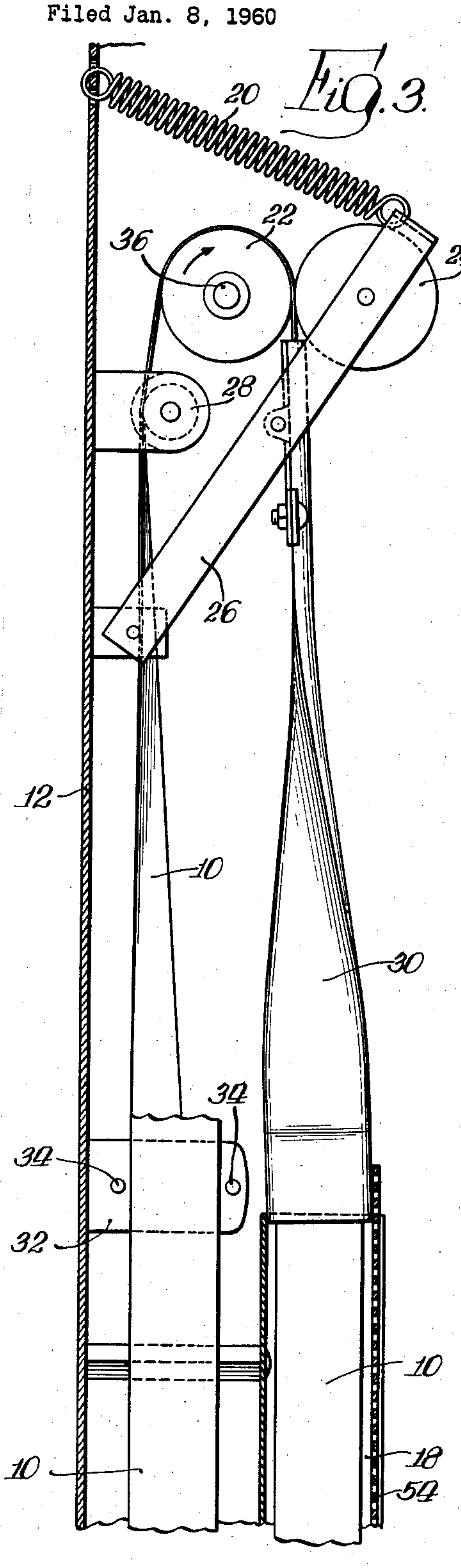
FIG. 3 is a sectional view along line 3—3 of FIG. 1.

FIG. 3 shows the tape driving mechanism. As the tape 10 enters the driving means, the tape receives a half twist as it is being pulled off of lower spool 17. The tape then passes over twist guide roller 28 and over rubber roller 22 mounted on coupling shaft 36. Coupling shaft 36 is attached to an electric motor which is the power source for the tape driving means. The tape passes between rubber roller 22 and idler roller 24. Idler roller 24 is attached to idler arm 26 which has a tension spring 20 at the metal roller end. Then the tape passes through half-twist member 30 where it receives another half twist prior to passing into unwound tape receptacle 18.

Figure 4:
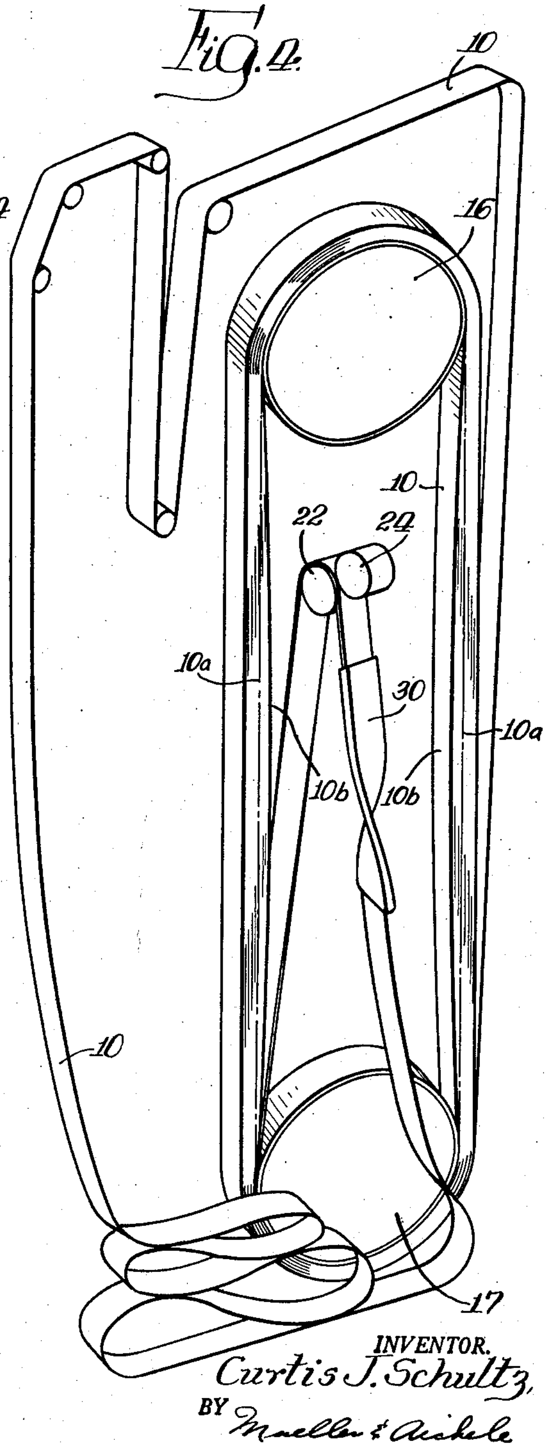
FIG. 4 is a diagrammatic view of the path of a continuous loop of tape used in the invention.

FIG. 4 is a diagrammatic view of a continuous loop of tape showing the path it takes when moving through the tape storage device. Movement along the path of the continuous loop of tape is caused by the driving means rotating the spools through friction between the inside loop and the periphery of the spools. As the inside loop of tape is being pulled, the spools rotate and tape coming from the programmer is wound on top of stacked loops of tape already stored on the spools. As tape is removed from the inside loop, the outer loops move closer toward the spools and finally become the inside loop. As the loops move inwardly and the distance between the extremities of each loop decreases, slack appears in the inner loops of tape so that all loops wound on the spools have the same length. The spacing between the axes of the spools or reels 16 and 17 is much greater than the diameter of the spools, being shown at least five times as great in the drawings, and therefore there is a substantial length of tape between the spools where the slack may appear. Such slack in the inner loops of tape 10 may be best seen in FIG. 4. Vertical dot-dash lines **10*a* represent the position which the innermost loop of tape would take without any slack. The slack which does develop in the innermost loop, designated as 10*b*, can be seen by comparison with the lines 10*a***. With the tape loops being of the same lengths there is no slippage between the loops as the tape is wound on the spools. For this reason, and because the inside loops are loose, the tape is subjected to a minimum amount of wear. After forming the inside loop in contact with the spools, the tape is given a half-twist as it is pulled off. After passing through the driving means, the tape goes through a half-twist member where is receives another half-twist so that it is in the correct position for storage in the unwound tape receptacle prior to further movement. Along its entire path, the tape is moved by action of the driving means.

After passing through the programmer, the tape goes around a roller that is part of a switch mechanism that causes periodic operation of the driving means during normal operation and renders the driving means inoperative if the tape breaks or tears. Also, this switch mechanism provides an alarm signal whenever the tape feeding and storage device has malfunctioned. After passing over the switch mechanism the tape is wound in a loop around the two spools and the loop begins traveling inwardly until it becomes the innermost loop and is then pulled by the driving means.

Although the tape shown in the drawings has uniform or parallel edges, the invention may be utilized for any type of flexible medium which can be stored and fed into automatic programmer apparatus. The tape may be a magnetic tape, a tape with punched holes, a tape with an information coating or any other tape which might contain various types of information.

The tape feeding and storing device provides continuous feeding of a very long tape loop so that an extremely long program can be run and can be continuously repeated. This device has been found to be highly satisfactory in a traffic control system wherein the program for a full week is provided on the tape and this is repeated week after week. The tape may provide frequently changing programs and alternate programs which can be selected as desired, with all the programs being on a single tape loop. The device is of simple construction, is reliable in operation and handles the tape without causing substantial wear or danger of breakage.

What is claimed is:

1. Apparatus for causing movement of a continuous loop of information tape along a predetermined path and storing the tape in a multi-layer stacked relation prior to passing through an automatic programmer device, said apparatus including in combination, an unwound tape receptacle, first and second spools for storing said tape in a plurality of loops of equal length about said spools, tape feed mechanism including a member causing a half twist of the tape along its longitudinal axis, first and second rollers, means for driving said first roller and an idler arm coupled to said second roller, said tape passing between said rollers which act as a friction drive to cause the loop of said tape adjacent said spools to be removed and passed through said feed mechanism to said receptacle, and a pivoted arm including a portion engaging the tape which extends from the programmer device to said spools, said arm being controlled by the length of tape between the programmer device and said spools and causing said driving means to operate when such length of tape reaches a predetermined amount, said spools rotating as said driving means operates to cause an outside loop to be wound and the tape received from said programmer device to be stored.

2. Apparatus for storing tape and feeding it to an automatic program device, said apparatus including in combination a mounting structure, first and second spools mounted on said structure in spaced relation, an elongated tape wound around said spools in a plurality of loops and extending from the outside loop and from the inside loop intermediate said spools, feeding means including first and second rollers, an electric motor, a half-twist member, and an idler arm, said first roller being coupled to said motor, said second roller and said half-twist member being coupled to said idler arm and causing tape to be removed from the inside loop and passing it between said first and second rollers and through said half-twist member, said feeding means causing said spools to rotate and wind tape on the outside loop with loops moving inwardly developing slack intermediate said spools so that all loops are the same length, a receptacle for storing unwound tape removed from the inside loop, switch means including an actuator coupled to the tape at a point thereon beyond said program device, said switch means including a first portion operating when slack is developed in said tape to allow said actuator to move to a first position to actuate said feeding means and thereby wind more tape on said spools, and a second portion operating when said tape allows said actuator to move beyond said first position to stop said feeding means, alarm means coupled to said second switch portion to indicate a break in tape continuity, and means for guiding the tape to the automatic program device prior to winding on said spools.

3. In apparatus for storing a continuous flexible tape as a plurality of loops wound around a pair of spools spaced at a distance substantially greater than the diameter of said spools, driving means for removing the loop contiguous to said spools including in combination, a storage receptacle for unwound tape, an electric motor and a first roller coupled thereto, an idler arm and a second roller coupled thereto, a spring for positioning said idler arm, and a half-twist member coupled to said idler arm, said first and second rollers being positioned to impart to said loop of tape a half twist as it is pulled from said spools by said first and second rollers, said tape being fed by said rollers through said half-twist member and stacked in a plurality of layers in said storage receptacle so as to be in proper position for further movement along a predetermined path to be rewound on the spaced spools.

4. Apparatus for storing tape and feeding it to an automatic program device including in combination, a mounting structure, first and second spools mounted on said structure in spaced relation, a continuous elongated tape wound around said spools in a plurality of loops and extending from the outside loop and from the inside loop intermediate said spools so that all loops are of substantially the same length feeding means for removing tape from said inside loop, a receptacle for storing multi-layers of unwound tape removed from the inside loop, switch means including an actuator coupled to the tape at a point thereon beyond said program device, said switch means including a first portion operating when sufficient slack is developed in said tape from said program device to allow said actuator to move to a first position to actuate said feeding means and thereby wind more tape on said spools, and a second portion operating when a break occurs in said tape to allow said actuator to move beyond said first position to stop said feeding means, alarm means coupled to said second switch portion to indicate said break in tape continuity, and means for guiding the tape to said automatic program device prior to winding on said spools.

5. Apparatus for storing flexible tape and feeding the same to an automatic program device including in combination, a mounting structure, first and second spools mounted on said structure and having axes positioned vertically one above the other, with said axes spaced from each other by a distance substantially greater than the diameter of said spools, a continuous elongated flexible tape wound around said spools in a plurality of loops and extending from the outside loop and from the inside loop intermediate said spools, feeding means including an electric motor and tape moving means driven thereby for moving said tape, said tape moving means engaging the tape extending from the inside loop and drawing said tape from said inside loop to cause rotation of said spools to wind tape passed through the program device on the outside loop, said loops moving from outside positions to inside positions as said spools rotate with said loops remaining of substantially the same length and having slack therein as they move from outside to inside positions, a receptacle positioned below said feeding means for storing tape removed from said spools, said tape drawn from said inside loop by said feeding means dropping into said receptacle and accumulating in stacked relation therein, means guiding the tape from said receptacle to the automatic program device and from the program device to said spools, and switch means coupled to said tape for controlling said feeding means.

6. Apparatus for storing flexible tape and feeding the same to an automatic program device including in combination a mounting structure, first and second spools mounted on said structure and having axes positioned vertically one above the other, with said axes spaced from each other by a distance substantially greater than the diameter of said spools, a continuous elongated flexible tape wound around said spools in a plurality of loops and extending from the outside loop and from the inside loop intermediate said spools, feeding means including an electric motor and tape moving means driven thereby for moving said tape, said tape moving means engaging the tape extending from the inside loop and drawing said tape from said inside loop to cause rotation of said spools to wind tape passed through the program device on the outside loop, said loops moving from outside positions to inside positions as said spools rotate with said loops remaining of substantially the same length and having slack therein as they move from outside to inside positions, a receptacle positioned below said feeding means for storing tape removed from said spools, said tape drawn from said inside loop by said feeding means dropping into said receptacle and accumulating in stacked relation therein, means guiding the tape from said receptacle to the automatic program device and from the program device to said spool, and switch means coupled to said tape received from the program device and responsive to slack in the tape between the program device and said spools to control said feeding means.

References Cited in the file of this patent

UNITED STATES PATENTS

| | | |
|---|---|---|
| 1,137,912 | Sears et al. | May 4, 1915 |
| 1,288,531 | De Vry | Dec. 24, 1918 |
| 1,829,095 | King et al. | Oct. 27, 1931 |
| 1,968,250 | Frederick et al. | July 31, 1934 |
| 2,020,521 | Scott | Nov. 12, 1935 |
| 2,307,806 | Schnoor | Jan. 12, 1943 |
| 2,318,316 | Lawrence | May 4, 1943 |
| 2,666,596 | Rosenburgh et al. | Jan. 19, 1954 |

FOREIGN PATENTS

| | | |
|---|---|---|
| 24,120 | Great Britain | Oct. 31, 1907 |
| 253,994 | Great Britain | June 24, 1926 |
| 1,012,109 | France | Apr. 9, 1952 |